UNITED STATES PATENT OFFICE.

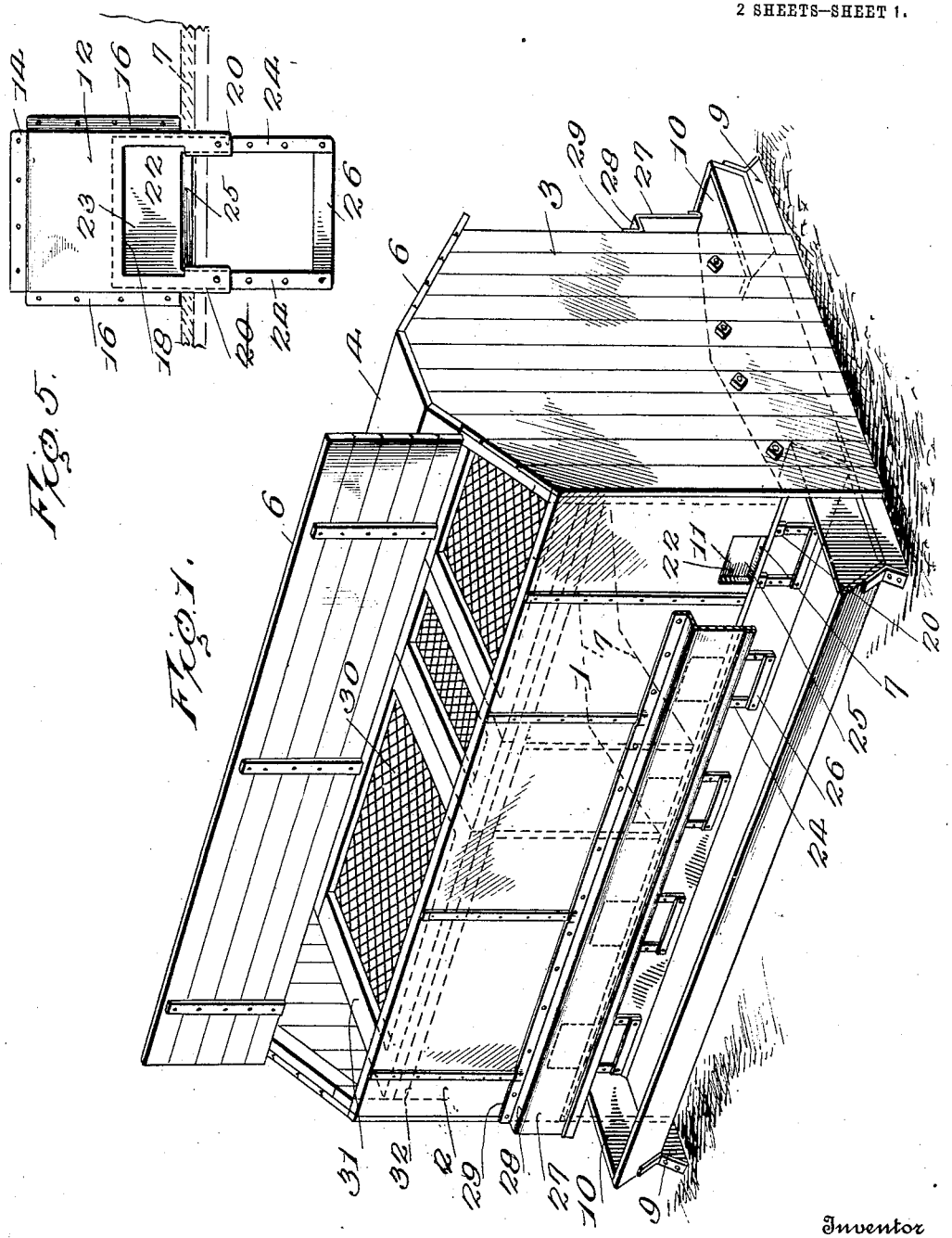

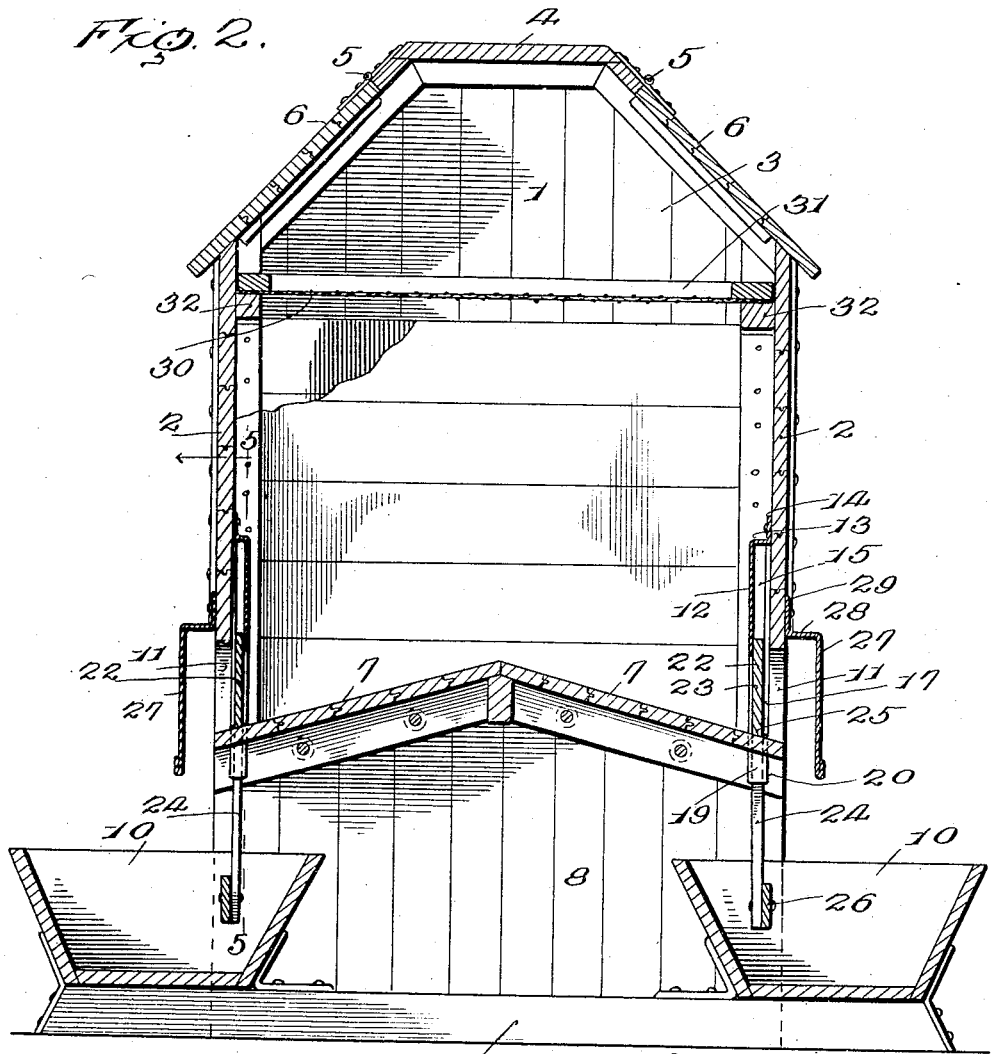

CECIL L. KIRKPATRICK, OF WAGNER, SOUTH DAKOTA.

HOG-FEEDER.

1,251,672.

Specification of Letters Patent.

Patented Jan. 1, 1918.

Application filed May 10, 1917. Serial No. 167,798.

*To all whom it may concern:*

Be it known that I, CECIL L. KIRKPATRICK, a citizen of the United States, residing at Wagner, in the county of Charles Mix and State of South Dakota, have invented certain new and useful Improvements in Hog-Feeders, of which the following is a specification.

This invention relates to hog feeders and has as its object to provide a device of this class designed particularly for the feeding of shelled corn and constructed to retain the corn in the hopper of the device until a valve is actuated by a hog desiring to feed.

It is another aim of the invention to so mount the valves which control the flow of grain from the hopper into the troughs that the valves will not be liable to become hung in elevated position due to the weight of the grain within the hopper but will immediately drop to closed position when released by the animal so that there will be no waste of grain which would otherwise be occasioned if the valves remained open.

Another aim of the invention is to provide means for positively directing the discharged grain into the trough so that the grain will not be likely to gush over the edge of the trough and be wasted when one the valves is lifted.

Another aim of the invention is to provide against the entrance into the hopper, at the time of filling the same, of corn cobs, husks, and other foreign matter which would be likely to clog the openings normally closed by the valves.

In the accompanying drawings:

Figure 1 is a perspective view of the feeder embodying the present invention;

Fig. 2 is a vertical transverse sectional view therethrough;

Fig. 3 is a sectional perspective view of one of the valve casings;

Fig. 4 is a similar view of one of the valves;

Fig. 5 is a vertical sectional view on the line 5—5 of Fig. 2 looking in the direction indicated by the arrow.

In the drawings, the hopper of the device is indicated in general by the numeral 1 and the same comprises side walls 2, end walls 3, and a top including a fixed section 4 to which are hinged, as at 5, lids 6 which normally rest in closed position upon the upper edges of the side and end walls 2 and 3. The hopper further includes a bottom 7 which is inclined downwardly from the longitudinal median line of the hopper toward the side walls 2 thereof. In order that the hopper may be supported at the proper elevation its end walls 3 are extended downwardly, as at 8, and provided with sills 9 which rest upon the ground and which project beyond the vertical edges of the said end walls 3 so as to support, at each side of the hopper, a trough, indicated by the numeral 10. Each side wall of the hopper is formed with a series of openings 11 through which grain is discharged from the hopper into the respective troughs 10 and by reference to Fig. 2 it will be observed that the said side walls 2 terminate at their lower edges in the plane of the outer edges of the bottom 7 and that the said outer edges of the inclined portions of the bottom 7 constitute the bottom walls of the openings so that no obstruction is offered to the free passage of the grain through the openings and into the troughs, which passage is, of course, assisted by the inclination given the portions of the bottom. Within the hopper at each opening 11 there is arranged a valve plate which is slidably mounted in a suitable casing. Each of the valve plate casings may be formed from a single piece of sheet metal and each casing comprises a back 12 which at its upper edge is provided with a flange 13 extending inwardly and thence upwardly, as at 14, and having its latter portion secured to the inner face of that side wall 2 upon which the casing is mounted. The back 12 is further provided at each vertical edge with a flange 15 which is first directed at right angles from the inner face of the back and thence laterally outwardly at right angles, as at 16, and is finally folded back upon itself, as at 17, the free edge of the portion 17 projecting inwardly beyond the plane of the flange 15. Thus the projecting portions of the flanges 17 provide, in conjunction with the inner face of the back 12, guides to receive the lateral edges of the valve plate, which plate will be presently specifically described. Opposite the respective openings 11, the back 12 of each valve plate casing is cut away to form an opening 18 so as to permit of the passage of the grain from the hopper and through the opening 11 and into the respective trough 10. At the lower side of the opening 18 the plate is bent in the direction of the side wall 2, as indicated by the numeral 19, and is thence bent laterally outwardly at right angles, as at 20, forming a boxing or guide 21 which serves a purpose which will now be explained. The valve plate is indicated in general by the numeral 22 and comprises an imperforate portion 23 having spaced depending slides 24 which slidably fit within the slides at the opposite sides of the valve plate casing and through the guides 21. The guides or boxes 21 extend upwardly through openings in the bottom 7 and, consequently, the slides 24 extend below the said bottom and when the valve is in normal position its portion 23 will rest at its lower edge, as at 25, upon the upper surface of the bottom 7 and the lower ends of the slides 24 will project downwardly into the respective trough 10. A cross bar 26 extends between and is secured at its ends to the lower ends of the slides 24. It will be observed that when the valve plates are in normal position they will completely close the openings 18 in their respective casing so that no grain can flow from the hoppers into the troughs.

From the foregoing it will be understood that a hog wishing to feed will root in the trough 10 and in doing so will engage the cross bar 26, thereby raising the valve plate and more or less wholly uncovering the openings 18 and 11, thereby permitting a quantity of grain to pass through these openings and into the trough. The animal in lowering its head to eat the discharged corn or grain will release the valve and the valve will drop by gravity to closed position, thereby cutting off the flow of grain from the hopper.

In order to cause the discharged corn or other grain to fall directly into the trough and thereby prevent scattering of the grain in a manner to result in its waste, a deflector plate 27 is provided at each side of the hopper and each of these plates at its upper edge is formed with a flange 28 and an attaching flange 29 secured to the respective side wall 2 above the openings 11 therein, the flange 28 spacing the plate from the said wall a sufficient distance to permit of free passage of the grain through the opening 11 and yet being positioned to extend opposite all of the openings in the respective side wall and downwardly a sufficient distance below the lower sides of the openings to properly deflect the grain discharged.

In order that corn introduced into the hopper through the open top normally closed by the lids 6, may be freed from pieces of corn cob and shucks, one or more screens 30 stretched within a frame 31 are removably supported upon cleats 32 within the upper portion of the hopper in such position that they may be readily removed. The mesh of the screens 30 is such that the largest grains of corn may readily pass through the screens but pieces of corn cob and husks will be retained upon the screen and after the hopper has been filled these screens may be removed and the cobs and husks dumped therefrom.

It will be understood that inasmuch as the plate 12 prevents the grain resting against the valve plate 23 when the valve plate is in open or elevated position, minimum resistance will be offered to the lowering movement of the said valve plate.

It is preferable that the interior of the feeder be divided into compartments designed to contain different kinds of grain, by the provision of partitions 7ª which are located relatively close to each other and preferably at opposite sides of the middle one of the feed openings.

Having thus described the invention, what is claimed as new is:

1. In a feeding device, a hopper having a discharge opening, a valve plate casing within the hopper having a wall spaced from the wall of the hopper above the opening therein, a valve plate mounted for sliding movement within the said casing and arranged when in elevated position to lie behind the said wall of the casing, and an abutment element carried by the valve plate and extending below the said opening.

2. In a feeder, a hopper having a discharge opening, a valve plate casing mounted within the hopper and having a wall located in spaced relation to the wall of the hopper above said opening, the said casing having guides fitting through the bottom of the hopper at the opposite sides of the discharge opening, a valve plate slidably mounted within the casing, spaced members extending downwardly from the said plate and slidably fitting the said guides, and a cross bar supported at the lower ends of the said members and comprising an abutment for engagement by a feeding animal.

In testimony whereof I affix my signature.

CECIL L. KIRKPATRICK. [L. S.]

Copies of this patent may be obtained for five cents each, by addressing the "Commissioner of Patents, Washington, D. C."